Nov. 17, 1970  K. E. B. KRUTZIKOWSKY  3,540,113

METHOD OF MAKING PLASTIC BODY

Original Filed Nov. 28, 1966

Inventor
Klaus E.B. Krutzikowsky
By Charles F. Lind
Attorney

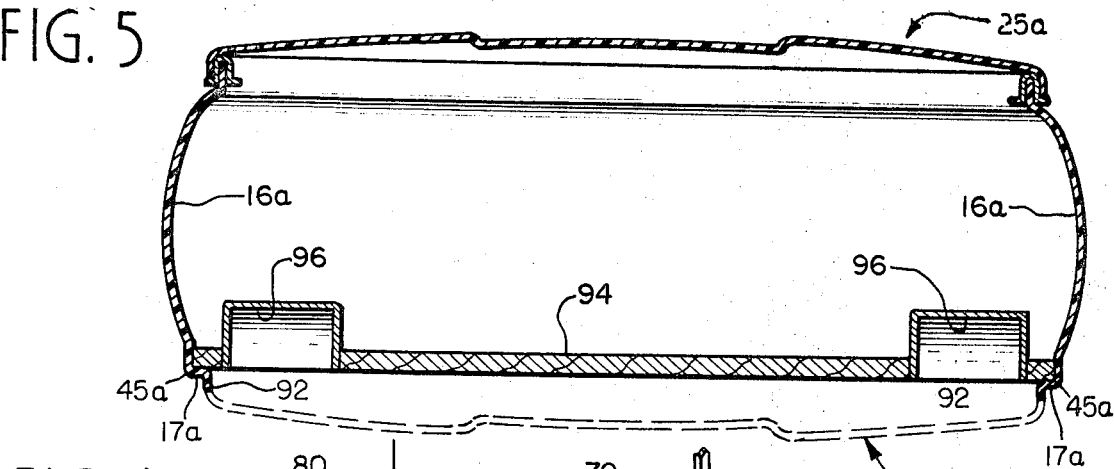
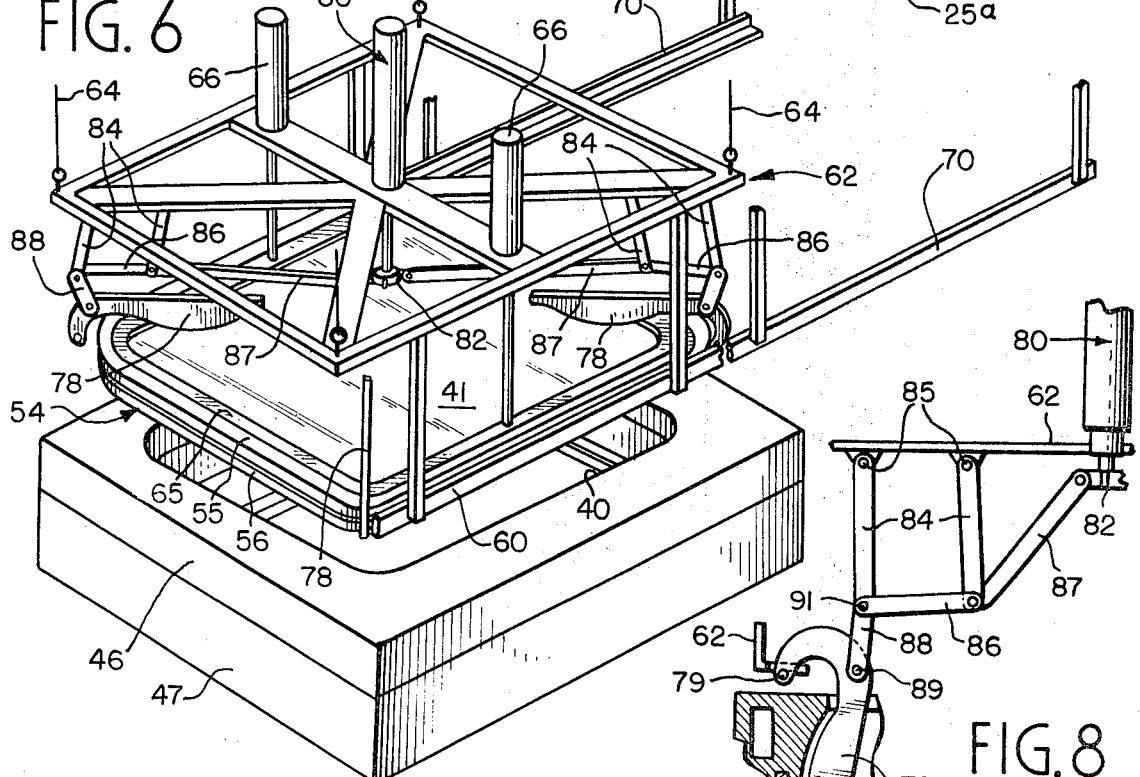
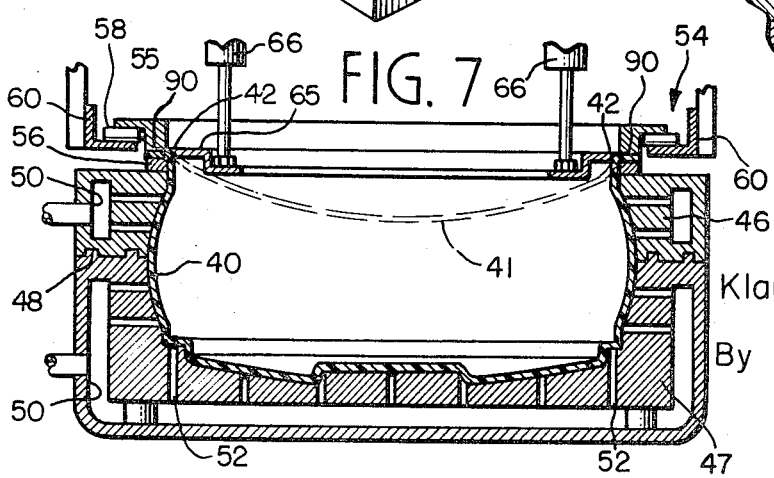

United States Patent Office 3,540,113
Patented Nov. 17, 1970

3,540,113
METHOD OF MAKING PLASTIC BODY
Klaus E. B. Krutzikowsky, 4331 N. Lowell Ave.,
Chicago, Ill. 60641
Continuation of application Ser. No. 597,364, Nov. 28,
1966, which is a continuation-in-part of application Ser.
No. 525,228, Feb. 4, 1966. This application June 2,
1969, Ser. No. 829,648
Int. Cl. B29c 17/04, 24/00, 27/00
U.S. Cl. 29—415                         4 Claims

ABSTRACT OF THE DISCLOSURE

A method of forming a plastic body having integrally interconnected vertical sidewall elements, a peripheral base section, and a detachable cover or roof section. A generally flat sheet of thermoplastic material is thermoformed to cup-shaped configuration. The bottom of the cup-shaped piece is removed from the remainder of the piece and is used to cover the open top of the remainder of the piece. A separate piece is used to close the opening in the remainder of the piece formed by the removal of the bottom. The bottom section of the cup-shaped piece can be formed with a larger periphery than the remainder of the piece so that the removed bottom section can be telescoped over the remainder of the piece. A trailer body can be formed using the noted method.

---

This is a continuation of my co-pending application entitled Trailer Body and Method of Making Same which was filed Nov. 28, 1966 having Ser. No. 597,364, now Pat. No. 3,455,596, as a continuation-in-part application of Ser. No. 525,228, filed Feb. 4, 1966, my Pat. 3,288,520.

This invention relates to a method of forming a trailer body construction, particularly from an A.B.S. thermoplastic, having integrally interconnected vertical sidewall elements and a peripheral base section integrally connected thereto about a continuous bottom corner.

Collapsible trailers, such as are commonly used for camping, generally include an open top body, and roof and side closure means therefor that are movable between opened and closed positions of the trailer. The above mentioned co-pending application disclosed and claimed structure for supporting the roof and side closure means in a collapsible manner relative to the body. This invention is directed to a method of forming an improved body construction that is generally lighter in weight, more durable and attractive, and as economical as comparable known prior art constructions.

Accordingly, an object of this invention is to provide a method of forming an improved body construction that is light in weight, durable, and which has continuously and uniformly interconnected integral vertical sidewall elements and a horizontal peripheral base section connected thereto about a continuous corner.

Another object of this invention is to provide a method of forming a body construction including body and roof elements that are molded simultaneously as a single piece and that are later separated to define the separate body and roof elements for end use in the trailer.

Another object of this invention is to provide an improved method of forming a body construction according to the previous objects, particularly by means of a mechanical assist vacuum forming construction of an A.B.S. thermoplastic.

These and other objects will be more fully appreciated after reference to the following specification and the accompanying drawings forming a part thereof, wherein.

Figure 1:
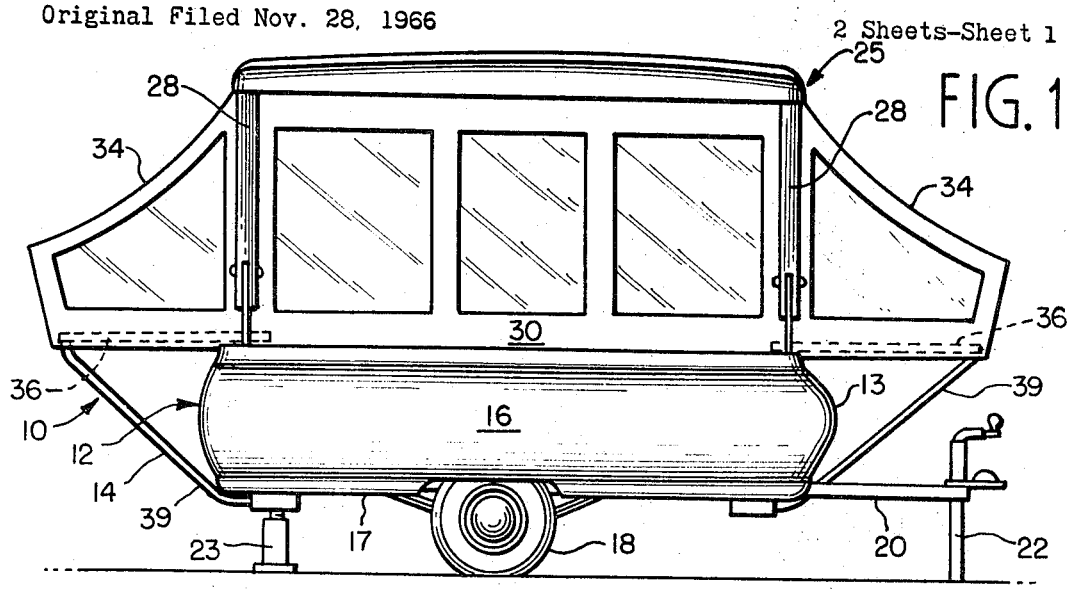
FIG. 1 is a side elevational view of a collapsible trailer having a preferred embodiment of the subject invention, the trailer being shown in the opened position.
Figure 2:
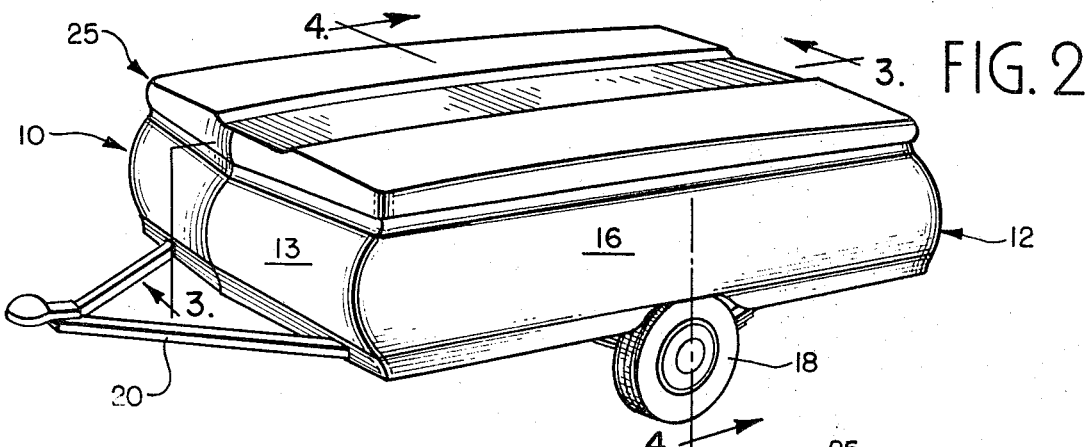
FIG. 2 is a perspective view of the trailer shown in FIG. 1, except showing it in the collapsed or closed position.
Figure 3:
Figure 4:
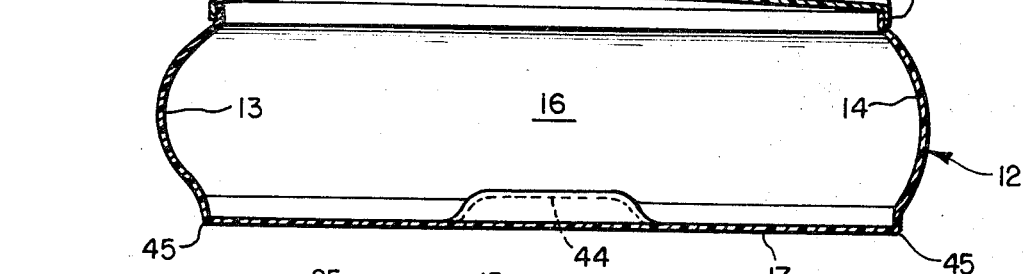

FIGS. 3 and 4 are elevational sectional views as seen generally from lines 3—3 and 4—4, respectively, of FIG. 2;

FIG. 5 is a side elevational sectional view of an alternate embodiment of a trailer body forming a part of the subject invention;

FIG. 6 is a perspective view of typical molding apparatus suitable for forming the subject trailer body construction;

FIG. 7 is an elevational sectional view as seen generally from line 7—7 of FIG. 6, of the molding apparatus having a trailer body partially formed therein; and FIG. 8 is an elevational view of one mechanical assist arm used in the molding apparatus of FIGS. 6 and 7.

Certain details of construction have intentionally been omitted from certain of the views where they are adequately disclosed elsewhere.

The subject trailer 10 includes a body 12 having vertical sidewall elements including a front wall 13, rearwall 14 and opposed sidewalls 16, and having a base 17 extending horizontally across the body and connecting the lower edges of the sidewall elements. Wheels 18 are appropriately mounted on the body 12 and a drawbar 20 is secured to the body for connection to a pulling vehicle (not shown), as is well known in the art. Jack means 22 and 23 provided at the front and rear of the trailer can be extended to stabilize the trailer when it is parked. A roof 25 is supported on the trailer body in the closed position of the trailer and presents vertical side skirts 26 telescoping over the body walls to make the closed trailer weatherproof. Corner supports 28 elevate the roof vertically above the trailer body in the opened position of the trailer. Foldable water repellant material, such as canvas or nylon, is connected between the roof and body to define a trailer enclosure within the opened trailer. Bays 34 are extended off the front and rear ends of the trailer, and each bay includes a base 36 slidably supported on opposing ledges of the body and supported in the open overhanging position by angle brackets 39.

The above mentioned co-pending application teaches particular support means 28 suitable for providing collapsible support of the roof relative to the trailer body.

An important feature of the subject trailer is the body construction, particularly in regard to the material used for and the manner of forming the body. Specifically, the roof and body are formed from an A.B.S. (acrylonitrile-butadiene-styrene) thermoplastic such as the U.S. Rubber Company product having the trade name Royalex. The material is initially a laminated flat sheet consisting of an inner core of expandable closed cell foam, sandwiching layers on the core of the U.S. Rubber Company product of Royalite, and outer ultraviolet protection skin or film. The sheet 41 is shaped by vacuum within a female mold 40 (see FIGS. 6 and 7) to the contour of the trailer body, the sheet being initially sealed at 42 to the top of the mold and the vacuum then being drawn in the mold. The sheet is generally heated to approximately 300 to 350° F. and the vacuum is approximately 20 to 27 inches. A mechanical assist mechanism 43 (see FIG. 8) can be abutted directly against the sheet to help contour it flush against the mold walls, particularly in the deep draw areas.

In this manner, the body is made having continuous and integrally interconnected sidewall elements 13, 14, and 16 and having horizontal base sections 17 integrally formed as continuations about the bottom corners 45 of the lower ends of the sidewall elements. This structure greatly strengthens the body for the mass of material used. Also, wheel wells 44 can be made integrally as part of the horizontal base element of the trailer. The body formed in this manner and from this plastic material is extremely lightweight although it is both structurally independent and durable against impact. Further, the body is weatherproof and can be fabricated from tinted material which then serves as the body color. If desired, the exterior can be treated by painting or buffing. Also the body can be machined such as by drilling, sawing or the like to render it particularly suitable for conventional assembly lines.

The mold 40 typically would include an upper section 46 and a lower section 47 which meet along a medial parting line or joint 48 which is at the furthest convex side contour on the body. Chambers 50 are defined by an outer wall 51 adjacent the exterior of the mold 40, and a plurality of passages 52 communicate between the chambers 50 and mold 40 to permit the drawing of vacuum from outlet pipes 53 through chambers 50 and ultimately to the mold 40. The sheet 41 is secured in a sheet frame 54, the frame including opposing clamping members 55 and 56. The upper clamping member 55 has rollers 58 mounted thereon which are adapted to roll on opposed rails 60 to bring the sheet into vertical registry over the mold. The rails 60 are supported by appropriate frame structure 62 which in turn is guided by appropriate rails (not shown) and moveable by cables 64 vertically above the mold. A seal frame 65 is supported by piston and cylinder arrangements 66 to the frame structure 62 and is thereby capable of moving relative to the sheet frame 54 and establishing a seal as at 42 of the sheet relative to the mold. Additional rails 70 aligned with rails 60 of frame 62 provide support for the sheet frame 54 in transit from the heating oven (not shown) used to heat the sheet 41 to the proper premolding temperature.

Typically, the sheet frame 54 thereby would be shifted along the rails 70 into position on the frame rails 60. The frame 62 is then lowered by the cables 64 until it is positioned vertically over the mold 40. Thereafter, the pistons 66 are energized to force the seal frame 65 downward against the sheet 41 which forms thereby the seal 42 between the sheet and mold. The mechanical assist mechanisms 43 are moved against the sheet, a vacuum is drawn in the mold 40, and the sheet thereby is forced flush against the mold to the contour of the body section.

The mechanical assist mechanism 43 includes an arm 78 supported by the frame 62 to move from above the sheet 41 against it and to force it into the deep draw areas of the mold. Preferably, a mechanism of this sort would be located at each of the four corners of the body. The pivot 79 for the arm 78 would thus be elevated above the sheet support frame 54, and the arm 78 itself would be shaped in a curved manner to permit it to be moved vertically above the frame 54 so that the frame can be rolled along rails 60 to bring the sheet 41 in place over the mold. This position is shown generally in FIG. 6.

FIG. 8 shows a typical mechanical assist mechanism 43 in its lowered position in near contact with the mold 40. The mechanisms are all powered by a piston and cylinder arrangement 80 which is supported centrally of the frame 62. A collar 82 is moved vertically relative to the frame by the piston 80, and a toggle type linkage is used to connect the collar 82 to the arm 78. The linkage includes links 84 pivoted at 85 to the frame 62, a link 86 pivotally connected between the links 84, and another link 87 between one link 84 and the collar 82. Link 88 connects the arm 78 at the pivot 89 and the linkage at pivot 91.

By proper geometry of the arm 78 and the linkage, a downward movement of the piston 80 and thus the collar 82, (as seen in FIG. 6) would pivot the links 84 in a clockwise direction and in turn pivot the arm 78 in a counterclockwise direction about its pivot 79 to the frame 62. The relatively short distance between the pivots 79 and 89 on the arm 78 and the toggle condition of the link 88 cause a rather large angular arm rotation about the pivot 79 for relatively short travel of the piston 80 and collar 82 to completely lift the arm 78 out of the way above the sheet frame 54, while still forcing the arm 78 with a large assist force against the sheet 41.

After the molded piece has cooled sufficiently and hardened, the top flange 90 can be severed to permit the elevation and removal of the sheet frame 54. The upper and lower mold sections can then be separated from one another in an appropriate manner and the molded piece removed from the molds from between the parting line 48.

Another aspect of this invention is the particular technique used for forming a body element and a removeable roof element therefor from a one piece molded part. This construction is disclosed in FIG. 5. Note that the actual contour of the body has the roof telescope over the upper perimeter of the body to offer a weatherproof construction. Moreover, the body can be suitably dimensioned so that the lower peripheral edge of the sidewall elements has a shape generally similar to but larger than the upper peripheral contour. Therefore, the subject technique permits both the body and the collapsible telescoping roof therefor to be formed from a single molded piece simultaneously.

FIG. 5 shows this construction and includes that the lower edge of the sidewall 16a curve about the corners 45a and extend inwardly in a horizontal direction to provide thereby a continuous peripheral base ledge 17a. This ledge 17a is integral with the adjacent sidewall and with the adjacent ledge and is thereby continuous about the lower edge of the body sidewall. The mold is then curved downwardly the distance required to form the telescoping roof section 25a for the body and thereafter is curved inwardly in a horizontal direction in a reverse contour to the roof contour. A single sheet drawn into the mold thus forms simultaneously both the body and roof elements. Thereafter, the body and roof elements can be separated along a separation area 92 generally designated. This provides that the lower section of the molded piece can be inverted and used as the roof element for the body and telescoped over the vertical peripheral section thereof.

A separate horizontal base member 94 is then used for the trailer body, the separate element being supported by the integral peripheral base element 17a of the body and being secured thereto in an appropriate manner such as by means of screws (not shown). Appropriate wheel wells 96 can be formed from separate shell elements and can be secured to the base.

What is claimed is:

1. A method of forming a body construction having an open top base and a cover adapted to cooperate removably with the open top of said base for closing the same, comprising the steps of thermoforming a generally flat sheet of thermoplastic to a single cup shaped piece having an open first end, continuous sides and a closed second end where the dimensions of the ends are somewhat similar to one another; separating the piece generally between the sides and closed second end to define thereby a tubular base component comprised generally of the sides of the piece but now open at both the original first end and also the second end thereof and a cover component comprised generally of the closed second end of the piece; using a separate element and securing it to the base component for closing the now open second end thereof; and using the cover component to cooperate with and close the originally open first end of the base component.

2. A method according to claim 1, wherein the body construction is for an item like a trailer body and accordingly is of generally rectangular configuration taken through the sides.

3. A method according to claim 1, wherein the second closed end is larger than the open first end of the piece such that the first end can be completely closed.

4. A method according to claim 3, wherein the piece is separated at a location spaced from the closed end so that a peripheral rim is defined larger than the open first end, whereby the rim can telescope over the open first end.

References Cited

UNITED STATES PATENTS

| | | | |
|---|---|---|---|
| 1,414,326 | 4/1922 | Heist | 264—152 |
| 3,004,285 | 10/1961 | Hagen. | |
| 3,198,375 | 8/1965 | Hunter. | |
| 3,214,830 | 11/1965 | Piker | 264—152 X |
| 3,259,942 | 7/1966 | Politis. | |

FOREIGN PATENTS 1,126,402    7/1956    France.

ROBERT F. WHITE, Primary Examiner

J. H. SILBAUGH, Assistant Examiner

U.S. Cl. X.R.

18—19; 29—416, 428; 113—116; 156—69, 264; 264—92, 152